Feb. 23, 1932.                A. W. CLARE                1,846,311
                      VALVE CAP AIR LEAK DETECTOR
                         Filed April 24, 1931

Inventor
*Aylmer W. Clare*

By  *John W. Maupin*
                Attorney

Patented Feb. 23, 1932

1,846,311

UNITED STATES PATENT OFFICE

AYLMER W. CLARE, OF SEATTLE, WASHINGTON

VALVE CAP AIR LEAK DETECTOR

Application filed April 24, 1931. Serial No. 532,572.

My invention relates to valve cap air leak detectors and certain objects of the invention are to provide, in combination with a vehicle tire inflation valve and casing, a cap threadedly installed on the outer end of the valve casing and having a thin diaphragm of rubber or other elastic material mounted therein and whereby said diaphragm will be caused to bulge outwardly through a hole in the top of the cap by air escaping through the valve thus furnishing visible means whereby leakage of the valve may be readily detected.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1:
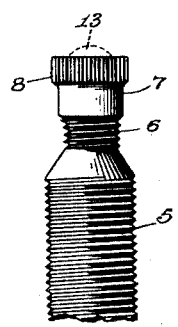
Figure 1 is a view in elevation showing a fragmentary portion of the exterior or casing of an inflation valve with my valve cap installed thereon and showing the bulged position of the diaphragm in dotted lines.

Referring to the drawings throughout which like reference numerals indicate like parts, the numeral 5 designates an inflation valve casing having the usual reduced neck portion 6 that is provided with screw threads on its outside. The numeral 7 designates my valve cap, as a whole, which is internally threaded to screw down onto the casing neck portion. Said valve cap is preferably, though not necessarily, provided with an upper enlargement 8 to furnish more interior room and the outside of said enlarged portion is milled or knurled for convenience in installing the cap as will be understood. The top of the valve cap is centrally provided with a relatively large hole 9.

A diaphragm 10 made of thin rubber or other elastic or fabric material is disposed within the valve cap 7 and preferably against the upper wall or top thereof. A gasket 11, of any desirable material but preferably flexible, is also disposed within the valve cap and preferably against the underside of the diaphragm. In fact the diaphragm may be glued or otherwise secured to the upper side of said gasket if desired. The peripheries of both the gasket and diaphragm fit snugly within the valve cap and when same is screwed down onto the neck portion 6 of the valve casing 5 the upper end of said neck engages against the underside of the gasket thus retaining said gasket and diaphragm securely in place against the top wall of the cap.

Figure 2:
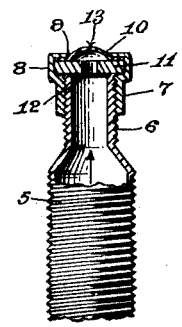
Fig. 2 is a corresponding view of a valve casing with its upper portion shown in central vertical section and showing the diaphragm in the bulged or protruding position.
Figure 3:
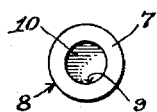
Fig. 3 is a top plan view of the valve cap.
Figure 4:
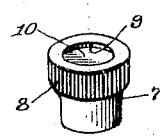
Fig. 4 is a detail view in perspective of the same.

The gasket 11 is centrally provided with a hole 12. Thus when air escapes through the valve and passes outwardly, as indicated by the direction arrow in Fig. 2 of the drawings, it will pass through said hole and press against the diaphragm 10. This air pressure will cause said diaphragm to bulge outwardly and thus protrude in part through the hole 9 in the top of the valve cap as shown in full lines in Fig. 2 at 13 and also as shown in dotted lines in Fig. 1. This protuberance of the diaphragm will be visible at some distance and the diaphragm may be brightly colored as in red or the like in order to make the protuberance more prominent and more readily apparent.

It will now be obvious that I have provided a simple, direct and efficient means for detecting leaks in inflation valves. This means also serves to determine that the leakage and cause of a flat tire is due to a defective or leaky valve and is not due to a puncture of the inner tire tube. In a large majority of cases flat tires are caused by leaky valves rather than by punctures and my device will definitely determine at sight whether the trouble is due to a faulty valve or a punctured inner tube thus saving much time in locating the cause of the trouble.

Having thus described my invention, it being understood that minor changes in its construction and arrangement may be made without departing from the scope and spirit of the invention, what I claim and desire to secure by Letters Patent of the United States is:—

1. As a new article of manufacture, a valve cap having a hole centrally through its top, an elastic diaphragm of thin flat rubber within the cap against the upper wall thereof, and a gasket having a hole therethrough and disposed adjacent the underside of the diaphragm.

2. As a new article of manufacture, a valve cap having a hole centrally through its top, an enlarged upper portion for the cap, an elastic diaphragm of thin flat rubber within the enlarged portion against the upper wall of the cap, and a flexible gasket within the cap having a central hole therethrough and disposed against the underside of the diaphragm.

3. The combination with an inflation valve and casing of a valve cap installed on the outlet end of the casing and having a hole through its top, an elastic diaphragm of thin flat rubber interposed between the outlet end of the casing and the top of the cap whereby outward air pressure will cause a portion of the diaphragm to protrude outwardly through said hole, and a gasket having a hole therethrough disposed adjacent the underside of the diaphragm.

4. The combination with an inflation valve and casing of a valve cap threadedly installed on the outlet end of the casing and having a hole centrally through its top, an elastic diaphragm of thin flat rubber within the cap against the upper wall thereof, and a flexible gasket having a central hole and interposed between the diaphragm and the top of the valve casing whereby pressure of air escaping from the valve and passing through the hole in the gasket will cause a portion of the diaphragm to bulge outwardly through the hole in the valve cap.

In testimony whereof I affix my signature.

AYLMER W. CLARE.